United States Patent
Hayashi

(10) Patent No.: US 11,193,463 B2
(45) Date of Patent: Dec. 7, 2021

(54) PRESSURE REGULATOR AND FUEL SUPPLY DEVICE

(71) Applicant: DENSO CORPORATION, Kariya (JP)

(72) Inventor: Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 16/077,849

(22) PCT Filed: Mar. 6, 2017

(86) PCT No.: PCT/JP2017/008695
§ 371 (c)(1),
(2) Date: Aug. 14, 2018

(87) PCT Pub. No.: WO2017/169530
PCT Pub. Date: Oct. 5, 2017

(65) Prior Publication Data
US 2019/0024615 A1 Jan. 24, 2019

(30) Foreign Application Priority Data
Mar. 30, 2016 (JP) .............................. JP2016-069318

(51) Int. Cl.
| F02M 37/00 | (2006.01) |
| F16K 17/06 | (2006.01) |
| F02M 63/02 | (2006.01) |
| F02M 63/00 | (2006.01) |

(52) U.S. Cl.
CPC .... *F02M 37/0029* (2013.01); *F02M 37/0052* (2013.01); *F16K 17/06* (2013.01); *F02M 63/005* (2013.01); *F02M 63/023* (2013.01); *F02M 63/0235* (2013.01)

(58) Field of Classification Search
CPC ............. F02M 37/0029; F02M 63/005; F02M 63/023; F02M 63/0235; F16K 31/365; F16K 17/06; Y10T 137/7836
USPC .................................................. 123/510, 457
See application file for complete search history.

(56) References Cited

U.S. PATENT DOCUMENTS

| 5,560,343 A | 10/1996 | Werkmann et al. |
| 5,830,348 A | 11/1998 | Vannoy et al. |
| 5,873,349 A | 2/1999 | Tuckey et al. |

(Continued)

FOREIGN PATENT DOCUMENTS

| JP | 2007146669 A | * 6/2007 |
| JP | 2013-174183 | 9/2013 |

*Primary Examiner* — Logan M Kraft
*Assistant Examiner* — Joshua Campbell
(74) *Attorney, Agent, or Firm* — Nixon & Vanderhye P.C.

(57) ABSTRACT

In a pressure regulator, a valve element nozzle is supported by a diaphragm, which partitions between an inlet portion and an outlet portion. The outlet portion includes an inner cover and an outer cover. The inner cover receives an adjusting spring in an inside space of the inner cover. A primary communication hole is formed in the inner cover to oppose the valve element nozzle, and a secondary communication hole is formed in the inner cover at a location, which is on a radially outer side of the primary communication hole. The outer cover covers the inner cover and thereby forms a fuel space, which is communicated with the inside space through the primary and secondary communication holes, at a location between the inner cover and the outer cover.

4 Claims, 13 Drawing Sheets

(56) References Cited

U.S. PATENT DOCUMENTS

| | | | | |
|---|---|---|---|---|
| 5,901,742 A * | 5/1999 | Kleppner | ............... | F02M 69/54 |
| | | | | 137/508 |
| 6,006,781 A | 12/1999 | Brandt et al. | | |
| 6,286,486 B1 | 9/2001 | Robinson et al. | | |
| 6,293,259 B1 | 9/2001 | Kilgore et al. | | |
| 6,318,405 B1 | 11/2001 | Brandt et al. | | |
| 6,629,543 B2 | 10/2003 | Kilgore | | |
| 7,131,457 B2 | 11/2006 | McIntyre et al. | | |
| 2009/0071444 A1 * | 3/2009 | Takagi | ................ | F02D 41/0025 |
| | | | | 123/447 |
| 2013/0032126 A1 * | 2/2013 | Suda | ................... | F02D 41/3854 |
| | | | | 123/458 |

* cited by examiner

PRESSURE REGULATOR AND FUEL SUPPLY DEVICE

CROSS REFERENCE TO RELATED APPLICATION

This application is the U.S. national phase of International Application No. PCT/JP2017/008695 filed Mar. 6, 2017, which designated the U.S. and claims priority to Japanese Patent Application No. 2016-69318 filed on Mar. 30, 2016, the entire contents of each of which are hereby incorporated by reference.

TECHNICAL FIELD

The present disclosure relates to a pressure regulator and a fuel supply device.

BACKGROUND ART

Previously, a widely known fuel supply device includes: a fuel pump that discharges fuel to a fuel flow passage, which extends toward an internal combustion engine; and a pressure regulator that regulates a fuel pressure in the fuel flow passage.

As this type of pressure regulator of the fuel supply device, the patent literature 1 discloses a pressure regulator, in which a valve element nozzle is supported by a diaphragm that serves as a partition element, which partitions between an inlet portion and an outlet portion. With this configuration, branched fuel, which is branched from the fuel flow passage to the inlet portion, is discharged to the outlet portion through the valve element nozzle, so that a negative pressure is exerted to the diaphragm, and thereby a valve opening operation of the valve element nozzle is executed against the resilient member. Therefore, when a branch flow rate of the branched fuel supplied from the fuel flow passage is increased, the valve opening operation of the valve element nozzle is assisted through use of the negative pressure. Thereby, an increase in the fuel pressure to be regulated is limited. Accordingly, a load, which is applied to the fuel pump, is reduced to improve fuel consumption.

In the pressure regulator disclosed in the patent literature 1, the outlet portion includes a cover that receives the resilient member in an inside space of the cover, which exerts the negative pressure to the diaphragm. The branched fuel, which is discharged from the valve element nozzle, is drained from the inside space of this cover. In the inside space of the cover, at an opposing location, which is opposed to the valve element nozzle in the axial direction, the branched fuel can be entrained by the discharged jet flow of the fuel discharged from the valve element nozzle, so that the branched fuel is drained from the inside space of the cover along with the discharged jet flow of the fuel. However, at a location, which is radially outward of the opposing location in the inside space of the cover, the branched fuel is stagnated and is left there. Therefore, in the inside space of the cover, characteristics of the branched fuel, which is stagnated, are changed to possibly cause corrosion or deterioration of the cover and the resilient member to possibly deteriorate the durability.

CITATION LIST

Patent Literature

PATENT LITERATURE 1: U.S. Pat. No. 6,286,486B1

SUMMARY OF INVENTION

The present disclosure is made in view of the above disadvantage, and it is an objective of the present disclosure to provide a pressure regulator and a fuel supply device that can ensure durability thereof.

In order to achieve the above objective, according to a first aspect of the present disclosure, there is provided a pressure regulator that regulates a fuel pressure in a fuel flow passage, which extends from a fuel pump toward an internal combustion engine, the pressure regulator including:

an inlet portion and an outlet portion;

a partition element that partitions between the inlet portion and the outlet portion; and a valve element nozzle that is supported by the partition element, wherein:

the valve element nozzle is driven to execute a valve opening operation of moving the valve element nozzle in an axial direction against a resilient member when a negative pressure is applied to the partition element through discharging of branched fuel, which is branched from the fuel flow passage to the inlet portion, to the outlet portion through the valve element nozzle; and the outlet portion includes:

an inner cover that receives the resilient member in an inside space of the inner cover, which exerts the negative pressure against the partition element, wherein a primary communication hole is formed in the inner cover to oppose the valve element nozzle in the axial direction, and a secondary communication hole is formed in the inner cover at a location, which is on a radially outer side of the primary communication hole; and an outer cover that covers the inner cover and thereby forms a fuel space, which is communicated with the inside space through the primary communication hole and the secondary communication hole, at a location between the inner cover and the outer cover, to discharge the branched fuel from the fuel space.

Furthermore, in order to achieve the above objective, according to a second aspect of the present disclosure, there is provided a fuel supply device including:

a fuel pump that discharges fuel to a fuel flow passage, which extends toward an internal combustion engine; and a pressure regulator that regulates a fuel pressure in the fuel flow passage and includes:

an inlet portion and an outlet portion;

a partition element that partitions between the inlet portion and the outlet portion; and a valve element nozzle that is supported by the partition element, wherein:

the valve element nozzle is driven to execute a valve opening operation of moving the valve element nozzle in an axial direction against a resilient member when a negative pressure is applied to the partition element through discharging of branched fuel, which is branched from the fuel flow passage to the inlet portion, to the outlet portion through the valve element nozzle; and the outlet portion includes:

an inner cover that receives the resilient member in an inside space of the inner cover, which exerts the negative pressure against the partition element, wherein a primary communication hole is formed in the inner cover to oppose the valve element nozzle in the axial direction, and a secondary communication hole is formed in the inner cover at a location, which is on a radially outer side of the primary communication hole; and an outer cover that covers the inner cover and thereby forms a fuel space, which is communicated with the inside space through the primary communication hole and the secondary communication hole, at a location between the inner cover and the outer cover, to discharge the branched fuel from the fuel space.

At the outlet portion of the first and second aspects, the outer cover covers the inner cover that forms the primary and secondary communication holes while the resilient member is received in the inside space of the inner cover that exerts the negative pressure to the partition element. Thereby, the fuel space, which is formed between the outer cover and the inner cover, is communicated with the inside space of the inner cover through the primary communication hole, which is opposed to the valve element nozzle in the axial direction, and the secondary communication hole, which is located on the radially outer side of the primary communication hole, so that the fuel space receives the effects of the negative pressure. Thus, the branched fuel, which is discharged from the valve element nozzle, is suctioned into the fuel space by the action of the negative pressure through the primary communication hole that is located at the location where the discharged branched fuel is directed. Then, although a portion of the branched fuel is drained from the outer cover, the remaining branched fuel, which is not drained from the outer cover, is suctioned into the inside space by the action of the negative pressure through the secondary communication hole located on the radially outer side of the inside space. The remaining branched fuel, which remains in the inside of the outer cover, can be circulated between the inside space and the fuel space in the above-described manner until the remaining branched fuel is drained from the outer cover, so that the branched fuel is less likely stagnated in the outlet portion. Thus, it is possible to limit occurrence of, for example, the corrosion or the deterioration of the covers and the resilient member, which would be otherwise induced by a change in the characteristics of the branched fuel that is stagnated in the outlet portion. As a result, durability can be ensured.

BRIEF DESCRIPTION OF DRAWINGS

The present disclosure, together with additional objectives, features and advantages thereof, will be best understood from the following description in view of the accompanying drawings.

DESCRIPTION OF EMBODIMENTS

Hereinafter, an embodiment of the present disclosure will be described with reference to the drawings.

Figure 1:
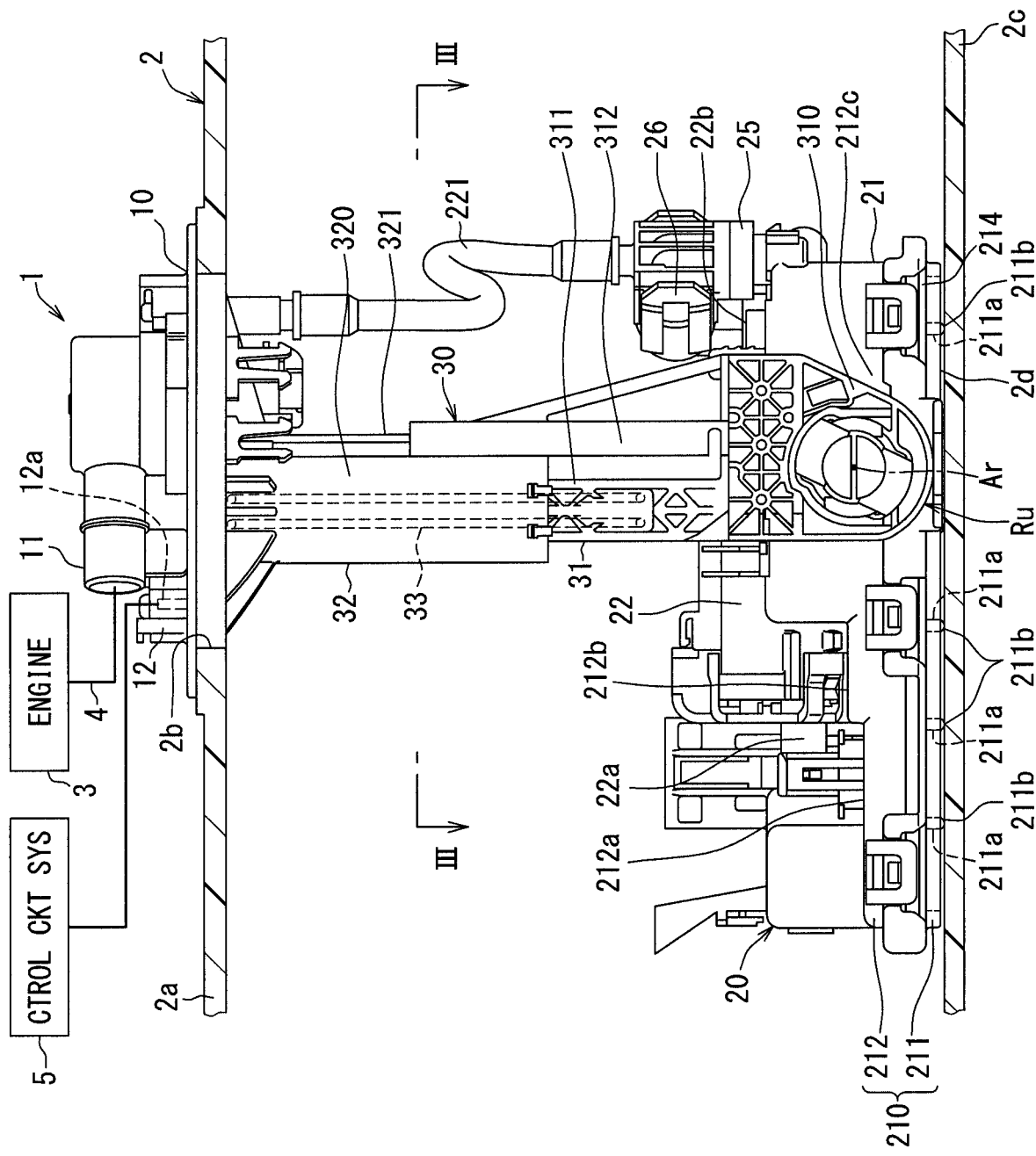
FIG. 1 is a front view of a fuel supply device according to an embodiment of the present disclosure.
Figure 2:
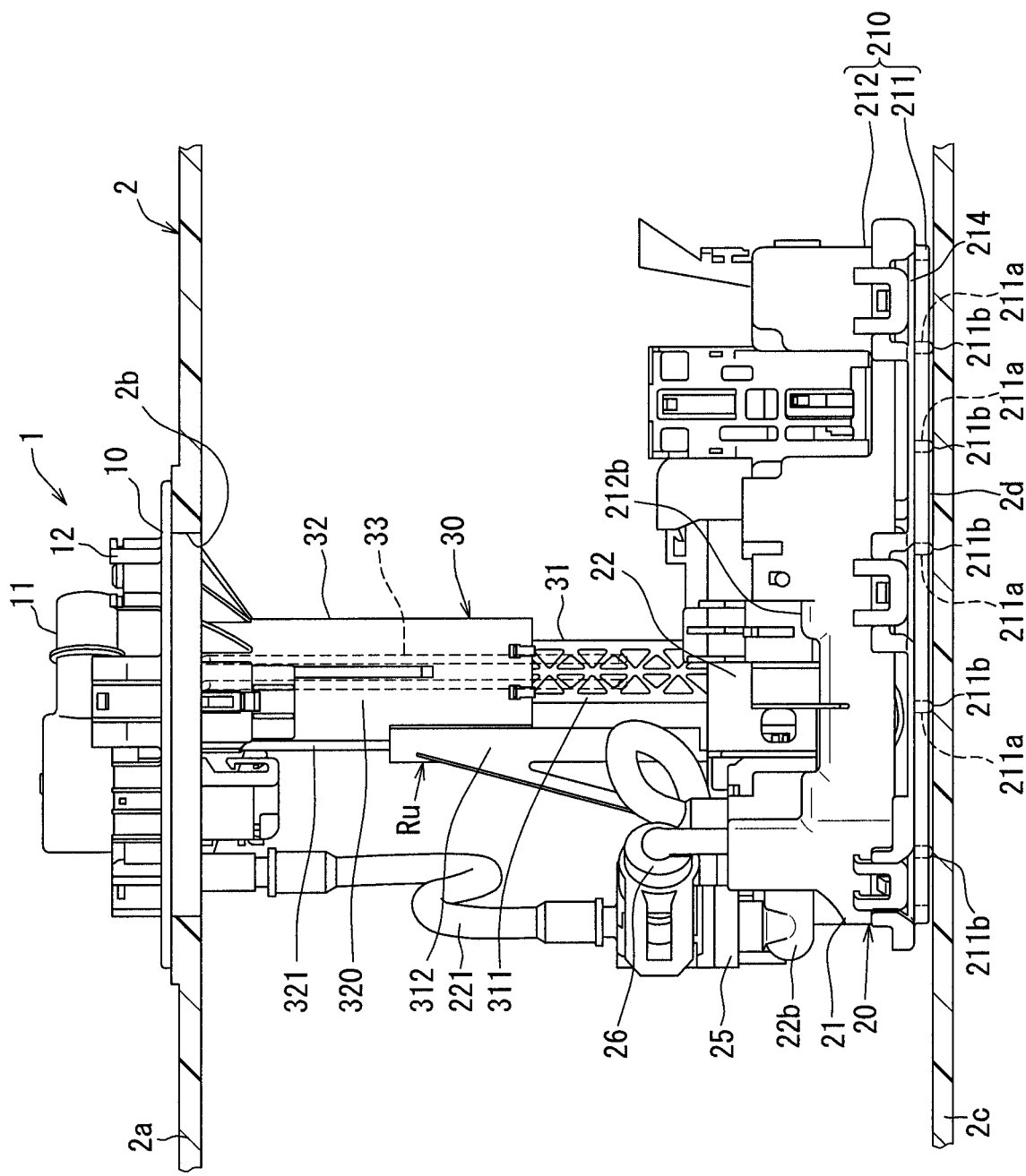
FIG. 2 is a rear view of the fuel supply device according to the embodiment.

As shown in FIG. 1, a fuel supply device 1 according to an embodiment of the present disclosure is installed to a fuel tank 2 and is thereby applied to an internal combustion engine 3 of a vehicle. The fuel supply device 1 supplies fuel, which is stored in the fuel tank 2 at the vehicle, to the internal combustion engine 3 located at an outside of the fuel tank 2. Here, as shown in FIGS. 1 and 2, the fuel tank 2 is made of resin or metal and is shaped into a hollow form as a whole. An insertion hole 2b extends through an upper wall 2a of the fuel tank 2. The fuel supply device 1 is inserted into an inside of the fuel tank 2 through the insertion hole 2b. Under the above-described inserted state, the internal combustion engine 3, which is a supply destination of the fuel from the fuel supply device 1, may be a gasoline engine or a diesel engine. A longitudinal direction and a transverse direction of FIGS. 1 and 2, which show the inserted state of the fuel supply device 1 in the fuel tank 2, substantially coincide with a vertical direction and a horizontal direction, respectively, of the vehicle placed on a horizontal plane.

Overall Structure

First of all, an overall structure of the fuel supply device 1 will be described. The fuel supply device 1 includes a cover body 10, a pump unit 20 and a coupling stay 30.

The cover body 10 is made of resin and is shaped into a circular plate form. The cover body 10 is installed to an upper wall 2a of the fuel tank 2. By this installation, the cover body 10 closes the insertion hole 2b. The cover body 10 has a fuel supply pipe 11 and an electrical connector 12, which are integrated together in one piece. The fuel supply pipe 11 is communicated with the pump unit 20 in the inside of the fuel tank 2. As shown in FIG. 1, the fuel supply pipe 11 is communicated with a fuel path 4 that extends from the fuel tank 2 to the internal combustion engine 3 at the outside of the fuel tank 2. Under this communicating state, when the pump unit 20 discharges the fuel, which is suctioned from the inside of the fuel tank 2, toward the internal combustion engine 3 located at the outside of the fuel tank 2, the discharged fuel is supplied from the fuel supply pipe 11 to the internal combustion engine 3 through the fuel path 4.

The electrical connector 12 receives a plurality of metal terminals 12a. Each metal terminal 12a is electrically connected to a fuel pump 22 of the pump unit 20 in the inside of the fuel tank 2. Each metal terminal 12a is electrically connected to a control circuit system 5, such as an ECU, at the outside of the fuel tank 2. Under this electrically connected state, an operation of the fuel pump 22 is controlled based on a control signal(s) outputted from the control circuit system 5 through the respective metal terminals 12a.

The pump unit 20 is placed on the lower side of the cover body 10 in the inside of the fuel tank 2. As shown in FIGS. 1 to 4, the pump unit 20 includes a unit main body 21, the fuel pump 22, a passage member 25 and a pressure regulator 26. The unit main body 21 is shaped into a flat rectangular box form as a whole. The unit main body 21 is placed on a bottom wall 2c of the fuel tank 2. The unit main body 21 has a sub-tank 210 and a filter screen 214.

The sub-tank 210 includes a lower member 211 and an upper member 212. The lower member 211 is made of resin and is shaped into a flat plate form. A plurality of inflow holes 211a extends through the lower member 211 in the longitudinal direction. A plurality of projections 211b downwardly projects from the lower member 211. Each projection 211b contacts the bottom wall 2c of the fuel tank 2 from the upper side of the bottom wall 2c, so that an inflow gap 2d is formed between the lower member 211 and the bottom wall 2c. The fuel in the fuel tank 2 flows into each inflow hole 211a through the inflow gap 2d.

The upper member 212 is made of resin and is shaped into an inverted cup form. An outer periphery of the upper member 212 is fixed to an outer periphery of the lower member 211, so that the upper member 212 cooperates with the lower member 211 to form a storage space 210a of the sub-tank 210. A through-hole 212a extends through a portion of the upper member 212 in the longitudinal direction. The fuel in the fuel tank 2 flows into an inside of the upper member 212 through the through-hole 212a and is stored in the storage space 210a of the sub-tank 210.

Figure 3:
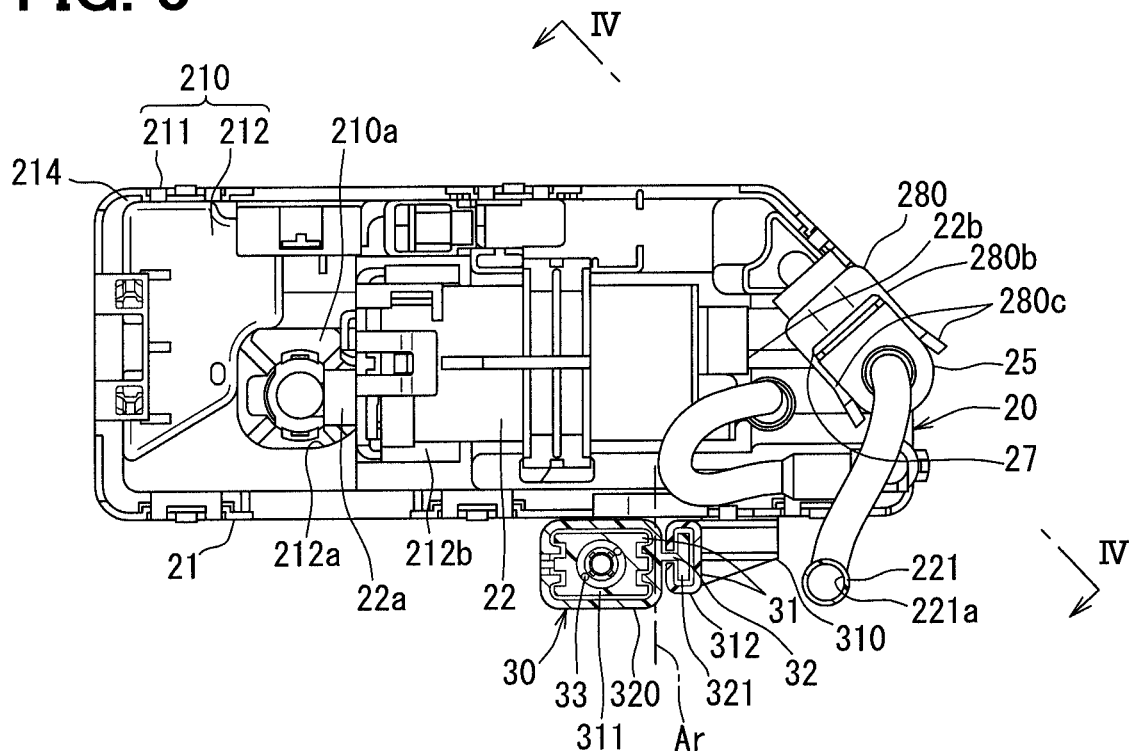
FIG. 3 is a cross-sectional view of the fuel supply device of the embodiment taken along line III-III in FIG. 1.

The filter screen 214 shown in FIGS. 1 to 3 is made of a material, such as a porous resin, a woven fabric, an unwoven fabric, a resin mesh or a metal mesh, which has a filtering function. The filter screen 214 is shaped into a flat rectangular bag form. An outer periphery of the filter screen 214 is clamped between the lower member 211 and the upper member 212. Under this clamped state, the fuel, which flows from the inside of the fuel tank 2 into the respective inflow holes 211a and the inside of the upper member 212, is filtered through the filter screen 214. The filtered fuel is suctioned from the inside of the filter screen 214 into the fuel pump 22.

The fuel pump 22 is, for example, an electric pump, such as a vane pump or a trochoid pump. The fuel pump 22 is shaped into a cylindrical form that is oriented to extend in one transverse direction. The fuel pump 22 is held by an upper portion 212b of the upper member 212 of the unit main body 21. The fuel pump 22 is electrically connected to each of the metal terminals 12a through a flexible wiring that is flexible. A suction port 22a of the fuel pump 22 is inserted into the inside of the upper member 212 through the through-hole 212a and is communicated with the inside of the filter screen 214. A discharge port 22b of the fuel pump 22 is communicated with the fuel supply pipe 11 through a fuel flow passage 25a of the passage member 25 and a communication passage 221a of a flexible tube 221 that is flexible. The fuel pump 22 is driven according to the control signal outputted from the control circuit system 5, so that the fuel pump 22 suctions the filtered fuel that is present in the inside of the filter screen 214. The fuel pump 22 discharges the suctioned fuel to the fuel flow passage 25a that extends toward the internal combustion engine 3.

The passage member 25 includes two resin parts that are assembled together into a hollow form as a whole. The passage member 25 is held by the upper portion 212b of the upper member 212 of the unit main body 21. The passage member 25 forms the fuel flow passage 25a in an inside of the passage member 25. The fuel flow passage 25a communicates between the discharge port 22b and the communication passage 221a, so that the fuel flow passage 25a can conduct the fuel discharged from the fuel pump 22 toward the internal combustion engine 3.

Figure 4:
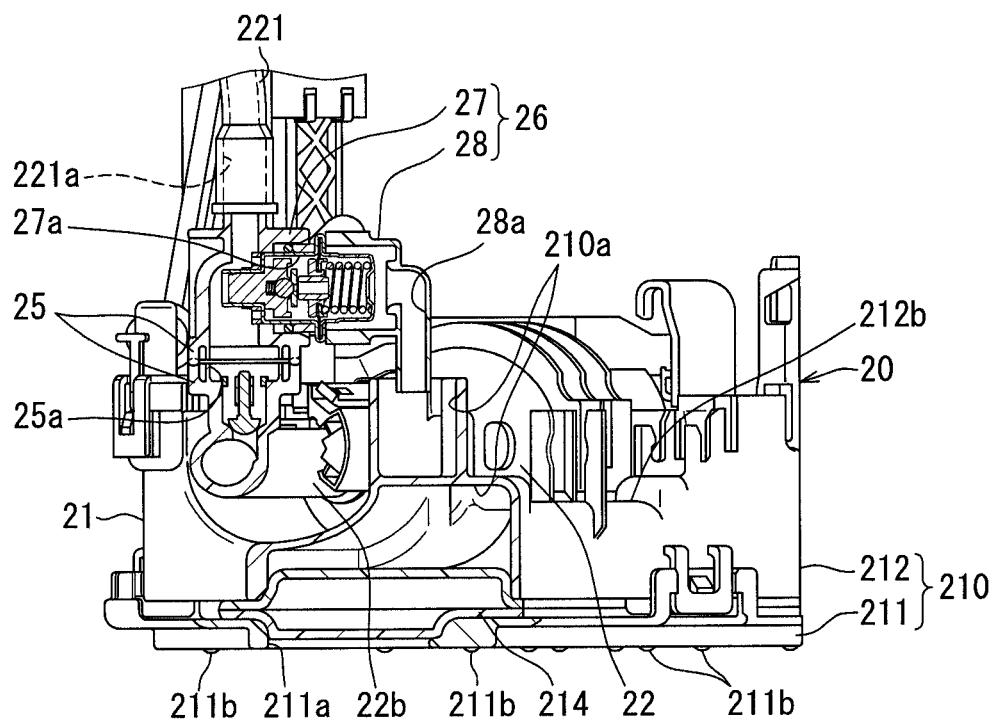
FIG. 4 is a cross-sectional view of the fuel supply device of the embodiment taken along line IV-IV in FIG. 3.

The pressure regulator 26 is a fuel pressure regulating valve of a diaphragm type. The pressure regulator 26 is held by the upper portion 212b of the upper member 212 of the unit main body 21 through the passage member 25. As shown in FIG. 4, the pressure regulator 26 has an inlet portion 27 and an outlet portion 28. The inlet portion 27 forms a branch passage 27a that is branched from a middle portion of the fuel flow passage 25a. The outlet portion 28 forms a drain passage 28a that is communicated with the storage space 210a of the sub-tank 210 through the upper member 212.

At the pressure regulator 26, a portion of the fuel, which flows through the fuel flow passage 25a, is branched to the branch passage 27a according to a consuming flow rate of fuel that is consumed during a normal operation of the internal combustion engine 3. At this time, the branched fuel, which is branched to the branch passage 27a, is controlled through a valve opening operation of the pressure regulator 26 to control a branch flow rate of the fuel that is discharged through the drain passage 28a and is returned to the storage space 210a. Therefore, a fuel pressure at the fuel flow passage 25a is adjusted to a pressure that corresponds to the consuming flow rate of the fuel that is consumed at the internal combustion engine 3.

As shown in FIG. 1, the coupling stay 30 is received in the inside of the fuel tank 2. The coupling stay 30 solely couples between the cover body 10 and the pump unit 20. The pump unit 20 is installed to the coupling stay 30 such that the pump unit 20 is rotatable about a rotational axis Ar that extends in another transverse direction. Under this installed state, rotational positions of the pump unit 20 relative to the coupling stay 30 about the rotational axis Ar include an operating rotational position Ru shown in FIGS. 1 and 2 and an inserting rotational position Ri shown in FIG. 5.

Figure 5:
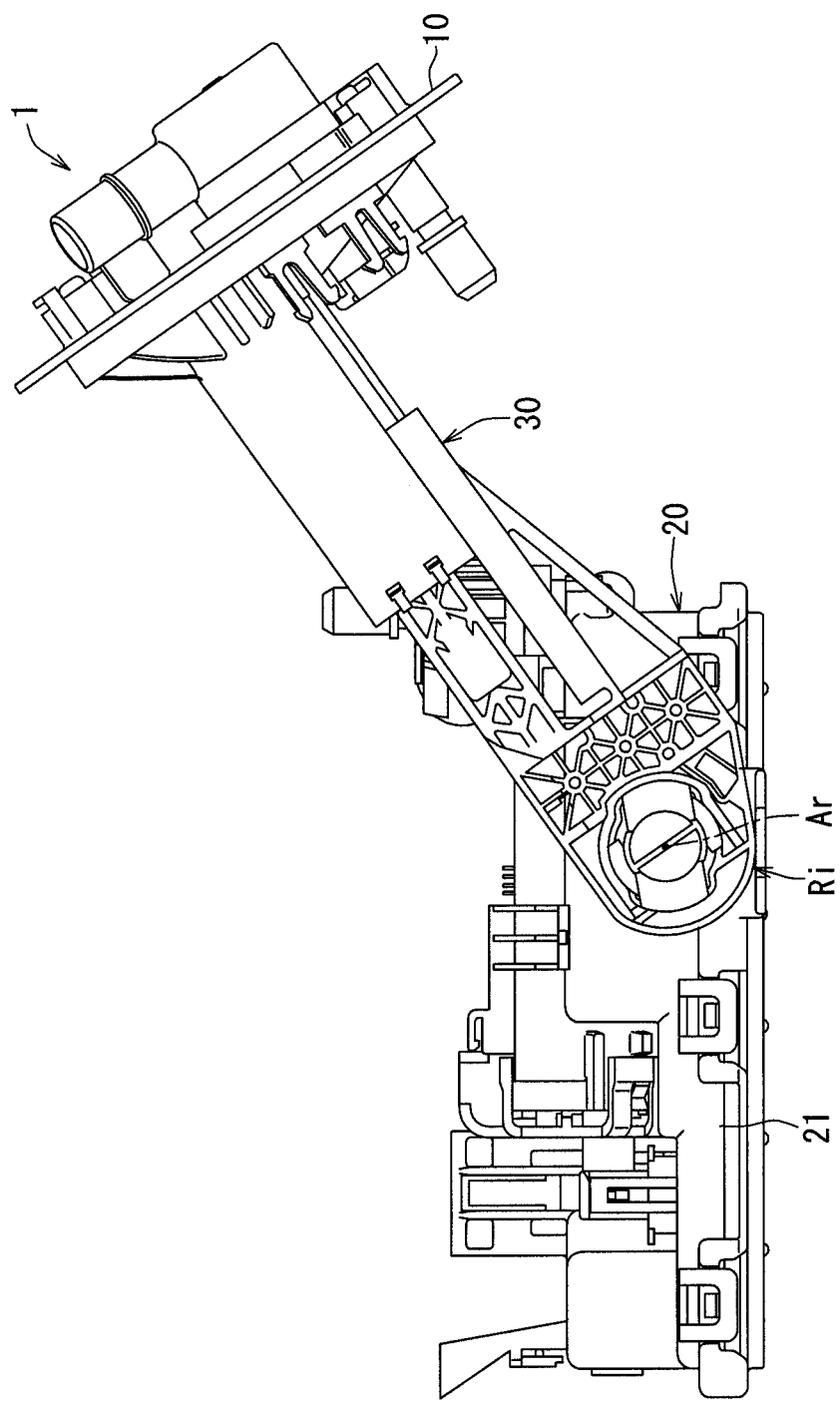
FIG. 5 is a front view showing a state of the fuel supply device that is different from the state of the fuel supply device shown in FIG. 1 according to the embodiment.

Specifically, the operating rotational position Ru is a rotational position of the pump unit 20 where the unit main body 21 is bent generally at a right angle relative to the coupling stay 30, which extends in the longitudinal direction in the inserted state of the fuel supply device 1 that is inserted into the inside of the fuel tank 2 as shown in FIGS. 1 and 2, so that the unit main body 21 is placed on the bottom wall 2c of the fuel tank 2. In contrast, the inserting rotational position Ri is a rotational position of the pump unit 20 where the unit main body 21 is less bent relative to the coupling stay 30 in comparison to the operating rotational position Ru before the time of inserting the fuel supply device 1 into the inside of the fuel tank 2, as shown in FIG. 5. At the inserting rotational position Ri, the entire fuel supply device 1 can be inserted from the pump unit 20 side into the fuel tank 2 through the insertion hole 2b.

As shown in FIGS. 1 to 3, the coupling stay 30 includes a lower stay 31, an upper stay 32 and an urging spring 33. The lower stay 31 includes a rotatable plate segment 310, a lower column segment 311 and a lower tube segment 312, which are combined together in one piece to form the lower stay 31. The rotatable plate segment 310 is made of resin and is shaped into a flat plate form that extends in both the longitudinal direction and the one transverse direction. The rotatable plate segment 310 is installed to a lateral portion 212c of the upper member 212 of the unit main body 21 such that the rotatable plate segment 310 is rotatable relative to the lateral portion 212c about the rotational axis Ar. The lower column segment 311 is made of resin and is shaped into a rectangular column form that extends in the longitudinal direction. The upper tube segment 312 is made of resin and is shaped into a rectangular tubular form that extends in the longitudinal direction.

The upper stay 32 includes an upper tube segment 320 and an upper column segment 321, which are combined together in one piece to form the upper stay 32. The upper tube segment 320 is made of resin and is shaped into a rectangular tubular form that extends in the longitudinal direction. The upper tube segment 320 downwardly extends from the cover body 10. The lower column segment 311 is slidably fitted into the upper tube segment 320 from the lower side of the upper tube segment 320. The upper column segment 321 is made of resin and is shaped into a rectangular column form that extends in the longitudinal direction. The upper column segment 321 downwardly extends from the cover body 10. The upper column segment 321 is slidably fitted into the lower tube segment 312 from the upper side of the lower tube segment 312.

The urging spring 33 is made of metal and is in a form of a coil spring. The urging spring 33 is received such that the urging spring 33 extends between the inside of the upper tube segment 320 and the inside of the lower column segment 311, so that the urging spring 33 is clamped between the upper tube segment 320 and the lower column segment 311. In the state where the urging spring 33 is engaged to the upper tube segment 320, the urging spring 33 exerts a restoring force against the lower column segment 311 in a downward direction. Each of the projections 211b of the unit main body 21 is urged against the bottom wall 2c of the fuel tank 2 by this restoring force. Therefore, a relative position between the lower stay 31 and the upper stay 32 changes in response to expansion and contraction of the fuel tank 2, so that a breakage of the coupling stay 30 is limited.

Details of Structure of Pressure Regulator

Next, details of the structure of the pressure regulator 26 will be described.

Figure 6:
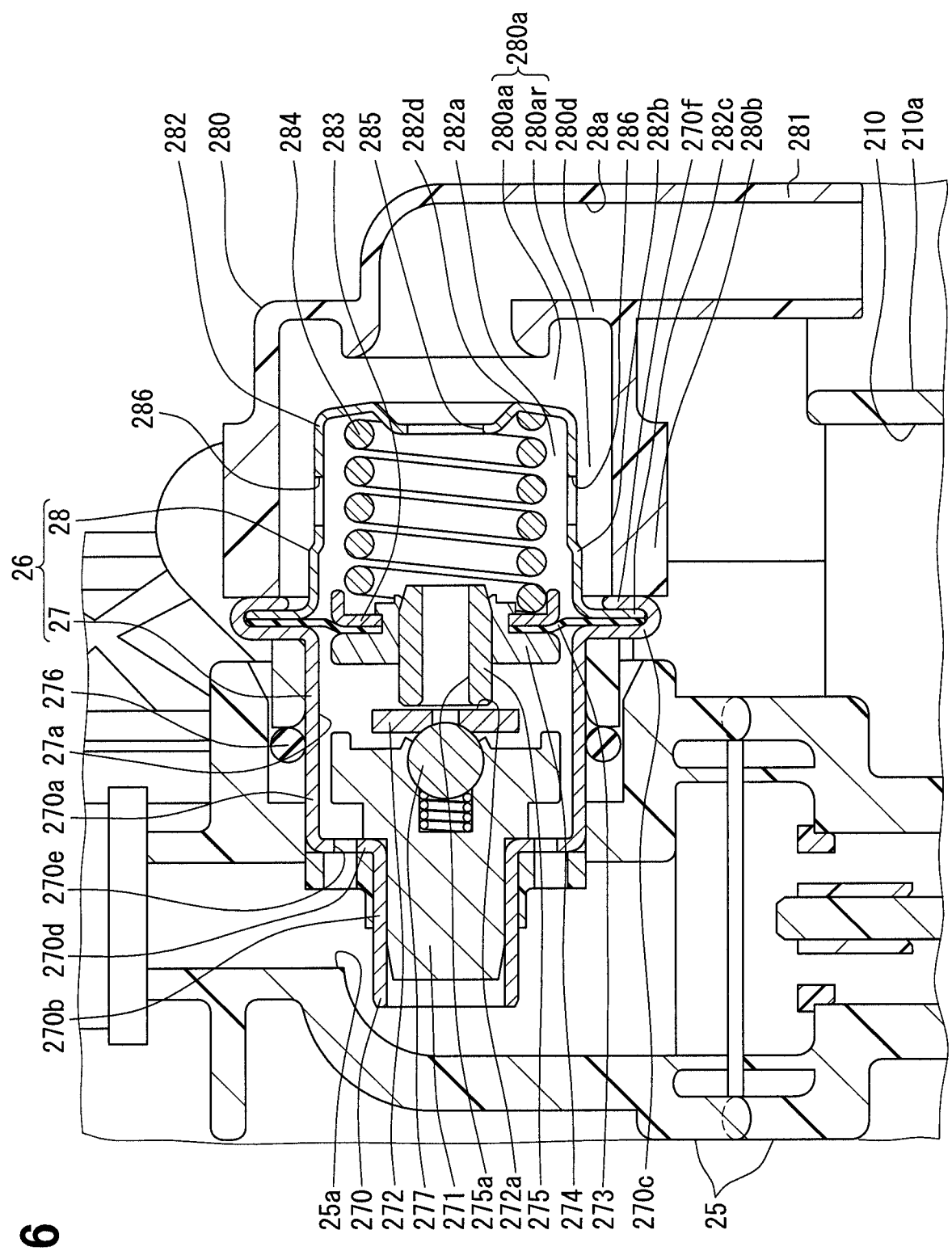
FIG. 6 is a cross-sectional view showing a portion of FIG. 4 in a magnified scale.

As shown in FIG. 6, the inlet portion 27 of the pressure regulator 26 includes a stationary cover 270, a stationary holder 271, a valve seat plate 272, a diaphragm 273, a movable holder 274 and a valve element nozzle 275.

The stationary cover 270 is made of metal and is in a form of a stepped cylindrical tube that is oriented to extend in the one transverse direction. In a state where a large diameter portion 270a of the stationary cover 270 is securely fitted to the passage member 25 through an O-ring 276 made of rubber, a small diameter portion 270b of the stationary cover 270 projects into the inside of the passage member 25. At the stationary cover 270, a flange 270c, which is formed at a periphery of the large diameter portion 270a on an opposite side that is opposite from the small diameter portion 270b, is shaped into a circular ring plate form that is substantially perpendicular to the one transverse direction. At the stationary cover 270, a plurality of flow inlets 270e extends in the one transverse direction through a stepped portion 270d, which connects between the large diameter portion 270a and the small diameter portion 270b. At the stationary cover 270, the branch passage 27a, which is formed in the inside of the large diameter portion 270a, is communicated with the fuel flow passage 25a through the flow inlets 270e. With this communicating configuration, the branched fuel (hereinafter also simply referred to as branched fuel), which is branched from the fuel flow passage 25a, flows into the branch passage 27a.

The stationary holder 271 is made of metal and is in a form of a stepped cylindrical column that is oriented to extend in the one transverse direction. In a state where the stationary holder 271 is securely fitted into the small diameter portion 270b of the stationary cover 270, the stationary holder 271 projects into the branch passage 27a. The valve seat plate 272 is made of metal and is in a form of a circular plate that is substantially perpendicular to the one transverse direction. The valve seat plate 272 is coaxially installed to the stationary holder 271 through a joint 277 that is in a form of a ball. With this installing configuration, in a state where the valve seat plate 272 is received in the branch passage 27a, the valve seat plate 272 is tiltable within a predetermined angular range. A valve seat surface 272a, which is a planar surface that extends in both of the longitudinal direction and the other transverse direction, is formed at the valve seat plate 272 on a side that is opposite from the stationary holder 271.

The diaphragm 273 is made of a composite material of rubber and a base fabric and is in a form of a circular ring film that partitions between the inlet portion 27 and the outlet portion 28 in the one transverse direction. The diaphragm 273 has flexibility and is thereby resiliently deformable. The flange 270c of the stationary cover 270 is crimped against the outer periphery of the diaphragm 273, so that the outer periphery of the diaphragm 273 is coaxially fixed to the flange 270c. The diaphragm 273 is exposed to the branch passage 27a on an opposite side, which is opposite from the outlet portion 28. In the present embodiment, the diaphragm 273 serves as a partition element.

The movable holder 274 is made of metal and is in a form of circular ring plate that has a plane, which faces in the one transverse direction. The movable holder 274 is coaxially installed to an inner periphery of the diaphragm 273. The movable holder 274, which is supported by the diaphragm 273 in the above-described manner, can reciprocate in the axial direction (specifically, the one transverse direction in FIG. 6) in the state where the movable holder 274 is coaxially disposed in the branch passage 27a.

The valve element nozzle 275 is made of metal and is in a form of a cylindrical tube that is oriented to extend in the one transverse direction. The valve element nozzle 275 is coaxially installed to an inner peripheral portion of the movable holder 274. The valve element nozzle 275, which is supported by the diaphragm 273 in the above-described manner, can reciprocate in the axial direction (specifically, the one transverse direction in FIG. 6) in the state where the valve element nozzle 275 coaxially projects in the branch passage 27a.

A nozzle passage 275a, which is in a form of a cylindrical hole that opens toward the valve seat plate 272, is formed in an inside of the valve element nozzle 275. A valve closing operation of seating the valve element nozzle 275 against the valve seat surface 272a of the valve seat plate 272 and a valve opening operation of lifting the valve element nozzle 275 away from the valve seat surface 272a of the valve seat plate 272 are implemented through the reciprocation of the valve element nozzle 275. Specifically, in the valve closing operation of seating the valve element nozzle 275 against the valve seat surface 272a, the valve element nozzle 275 blocks the communication between the branch passage 27a and the nozzle passage 275a. In contrast, in the valve opening operation of lifting the valve element nozzle 275 away from the valve seat surface 272a, the valve element nozzle 275 enables the communication between the branch passage 27a and the nozzle passage 275a.

In contrast to the inlet portion 27 discussed above, the outlet portion 28 of the pressure regulator 26 includes an outer cover 280, a drain pipe 281, an inner cover 282, a spring receiver 283 and an adjusting spring 284.

The outer cover 280 is made of resin and is in a form of a bottomed cylindrical tube that is oriented to extend in the one transverse direction. The outer cover 280 covers the inner cover 282 such that a fuel space 280a is formed between the outer cover 280 and the inner cover 282. At the outer cover 280, as shown in FIG. 3, a pair of fixing portions 280c, which project from a peripheral wall 280b of the outer cover 280 toward the inlet portion 27, is securely fitted to the passage member 25 by snap fit. An opposite side the peripheral wall 280b of the outer cover 280, which is opposite from a bottom wall 280d of the outer cover 280, coaxially makes a surface-to-surface contact relative to a crimped fixation portion 270f of the flange 270c of the stationary cover 270, which is crimped to securely hold the diaphragm 273, as shown in FIG. 6. Specifically, in the present embodiment, the flange 270c of the stationary cover 270 serves as a contact wall.

The drain pipe 281 is formed integrally with the bottom wall 280d of the outer cover 280 in one piece from resin. The drain pipe 281 is in a form of an L-shaped cylindrical tube that first extends in the one transverse direction and is then bent to extend in the longitudinal direction. In one extending portion of the drain pipe 281, which extends in the one transverse direction, a drain passage 28a is internally formed such that the drain passage 28a is coaxial with the nozzle passage 275a and is communicated with the fuel space 280a. In the other extending portion of the drain pipe 281, which extends in the longitudinal direction, the drain passage 28a, which is formed in the other extending portion, downwardly opens toward the storage space 210a of the sub-tank 210. The drain passage 28a, which has the above-described opening configuration, is configured to drain the branched fuel from the fuel space 280a and return the branched fuel to the storage space 210a.

The inner cover 282 is made of metal and is shaped into a bottomed cylindrical tube that is oriented to extend in the one transverse direction. An outer diameter of the inner cover 282 is smaller than an inner diameter of the outer cover 280, and an axial length of the inner cover 282 is smaller than an axial length of the outer cover 280. The inner cover 282 is coaxially received in an inside of the outer cover 280. In the inner cover 282, a flange 282c, which is formed at an opposite side of a peripheral wall 282b that is opposite from a bottom wall 282d, is securely held by the crimped fixation portion 270f of the flange 270c of the stationary cover 270, which is crimped to securely hold the flange 282c. An opposite side of the diaphragm 273, which is opposite from the valve seat plate 272, is exposed in an inside space 282a that is formed in an inside of the peripheral wall 282b of the inner cover 282. The valve element nozzle 275 coaxially projects into the inside space 282a such that an opposite side of the nozzle passage 275a of the valve element nozzle 275, which is opposite from the valve seat plate 272, is communicated with the inside space 282a.

With this configuration, the peripheral wall 282b, which surrounds the valve element nozzle 275 from a radially outer side of the valve element nozzle 275, forms a radial gap 280ar between the peripheral wall 282b and the peripheral wall 280b of the outer cover 280, which is located on the radially outer side of the peripheral wall 282b, and the radial gap 280ar functions as a portion of the fuel space 280a. In the inner cover 282, the bottom wall 282d, which is surrounded by the peripheral wall 282b from a radially outer side of the bottom wall 280d, forms an axial gap 280aa between the bottom wall 282d and the bottom wall 280d of the outer cover 280, which is opposed to the bottom wall 282d in the axial direction, and the axial gap 280aa functions as a remaining portion of the fuel space 280a.

A primary communication hole 285, which is in a form of a cylindrical hole, is formed at one location of the bottom wall 282d of the inner cover 282, which is opposed to the valve element nozzle 275 in the axial direction. The primary communication hole 285 extends through the bottom wall 282d in the axial direction (i.e., the one transverse direction in FIG. 6). The primary communication hole 285 has an inner diameter that is larger than an inner diameter of the nozzle passage 275a that is coaxial with the primary communication hole 285, so that the primary communication hole 285 enables generation of a negative pressure in the inside space 282a. The inside space 282a is communicated with the axial gap 280aa of the fuel space 280a through the primary communication hole 285.

A plurality of secondary communication holes 286, each of which is in a form of a cylindrical hole, extends through the peripheral wall 282b of the inner cover 282 at a plurality of locations, respectively, of the peripheral wall 282b that are spaced away from the bottom wall 282d in the axial direction. Each secondary communication hole 286 extends through the peripheral wall 282b in a radial direction (e.g., the longitudinal direction that enables draining of the water in FIG. 6), so that the secondary communication hole 286 is located on a radially outer side of the primary communication hole 285. An inner diameter of each secondary communication hole 286 has a predetermined size (large/small) relationship relative to the inner diameter of the primary communication hole 285 depending on the specification. The inside space 282a is communicated with the radial gap 280ar of the fuel space 280a through the secondary communication holes 286.

The spring receiver 283 is made of metal and is in a form of circular ring plate that has a plane, which faces in the one transverse direction. The spring receiver 283 is coaxially installed to an outer peripheral part of the movable holder 274. The spring receiver 283, which is supported by the diaphragm 273 in the above-described manner, can reciprocate in the axial direction (specifically, the one transverse direction in FIG. 6) in the state where the spring receiver 283 is coaxially disposed in the inside space 282a.

The adjusting spring 284 is made of metal and is in a form of a coil spring that extends in the one transverse direction. The adjusting spring 284 is coaxially received in the inside space 282a. The adjusting spring 284 is clamped between the spring receiver 283 and the bottom wall 282d of the inner cover 282 in the axial direction (specifically, the one transverse direction in FIG. 6). In a state where the adjusting spring 284 is engaged to the inner cover 282, the adjusting spring 284 exerts a restoring force to the valve element nozzle 275 toward a seating side of the valve element nozzle 275, at which the valve element nozzle 275 is seated against the valve seat plate 272.

As discussed above, the pressure regulator 26 is demanded to have the valve opening operation that increases the branch flow rate of the fuel, which is branched from the fuel flow passage 25a to the branch passage 27a of the inlet portion 27, when the consuming flow rate of the fuel at the internal combustion engine 3 is reduced. To meet this demand, the valve element nozzle 275 is driven to execute the valve opening operation of moving the valve element nozzle 275 in the axial direction against the restoring force of the adjusting spring 284 through application of a positive pressure of the branched fuel, which is supplied into the branch passage 27a.

Therefore, the pressure regulator 26 generates a negative pressure in the inside space 282a such that a pressure difference between the negative pressure and the atmospheric pressure increases when the branch flow rate of the branched fuel is increased. Thereby, when the negative pressure, which follows the increase in the branch flow rate of the branched fuel, is applied to the diaphragm 273, the valve element nozzle 275 is further driven in the axial direction against the restoring force of the adjusting spring 284 to further promote the valve opening operation of the valve element nozzle 275. Therefore, when the branch flow rate of the branched fuel is increased, the valve opening operation of the valve element nozzle 275 is further assisted to drain the increased amount of branched fuel from the inside space 282a and the fuel space 280a to the drain passage 28a. Thereby, an increase in the fuel pressure to be regulated is limited at the fuel flow passage 25a. In the present embodiment, the adjusting spring 284 serves as a resilient member.

At the inlet portion 27 during the valve opening operation, the positive pressure is applied by the branched fuel, which is supplied to the branch passage 27a, so that the flange 270c of the stationary cover 270 is urged toward the outlet portion 28. In contrast, at the outlet portion 28 during the valve opening operation, the negative pressure is applied from the inside space 282a to the fuel space 280a through the communication holes 285, 286, so that the outer cover 280 is urged toward the inlet portion 27. Because of the urgings of the flange 270c and the outer cover 280 toward the opposite sides, a contact-boundary surface between the flange 270c and the outer cover 280 is placed into a sealed state. Under this sealing contact state, the fuel space 280a and the inside space 282a are isolated from the outside of the outer cover 280 and are held airtight.

In view of the above discussion, according to the present embodiment, the following effects and advantages are achieved. At the outlet portion 28 of the present embodiment, the outer cover 280 covers the inner cover 282 that forms the communication holes 285, 286 while the adjusting spring 284 is received in the inside space 282a of the inner cover 282 that exerts the negative pressure to the diaphragm 273. Thereby, the fuel space 280a, which is formed between the outer cover 280 and the inner cover 282, is communicated with the inside space 282a through the primary communication hole 285, which is opposed to the valve element nozzle 275 in the axial direction, and the secondary communication holes 286, which are located on the radially outer side of the primary communication hole 285, so that the fuel space 280a receives the effects of the negative pressure. Thus, the branched fuel, which is discharged from the valve element nozzle 275, is suctioned into the fuel space 280a by the action of the negative pressure through the primary communication hole 285 that is located at the location where the discharged branched fuel is directed. Then, although a portion of the branched fuel is drained from the outer cover 280, the remaining branched fuel, which is not drained from the outer cover 280, is suctioned into the inside space 282a by the action of the negative pressure through the secondary communication holes 286 located on the radially outer side of the inside space 282a. The remaining branched fuel, which remains in the inside of the outer cover 280, can be circulated between the inside space 282a and the fuel space 280a in the above-described manner until the remaining branched fuel is drained from the outer cover 280, so that the branched fuel is less likely stagnated in the outlet portion 28. Thus, it is possible to limit occurrence of, for example, corrosion or deterioration of the covers 280, 282 and the adjusting spring 284, which would be otherwise induced by a change in the characteristics of the branched fuel that is stagnated in the outlet portion 28. As a result, durability can be ensured.

Furthermore, in the present embodiment, at the inner cover 282, which is in the form of bottomed tube, the secondary communication holes 286 are formed through the peripheral wall 282b, which surrounds the valve element nozzle 275 from the radially outer side of the valve element nozzle 275, and the primary communication hole 285 is formed through the bottom wall 282d that is surrounded by the peripheral wall 282b from the radially outer side of the bottom wall 282d. Thereby, the axial gap 280aa, which is formed between the outer cover 280 and the bottom wall 282d and is communicated with the primary communication hole 285, and the radial gap 280ar, which is formed between the outer cover 280 and the peripheral wall 282b and is communicated with the secondary communication hole 286, function as the fuel space 280a. Thereby, even in the case where the branched fuel is suctioned from the primary communication hole 285 into the gaps 280aa, 280ar by the action of the negative pressure, this branched fuel can be circulated into the inside space 282a through the secondary communication holes 286. Thus, this branched fuel is less likely stagnated in the radial gap 280ar. Thus, it is possible to limit occurrence of, for example, corrosion or deterioration of the covers 280, 282, which would be otherwise induced by the change in the characteristics of the branched fuel that is stagnated in the radial gap 280ar. As a result, the durability can be ensured.

Furthermore, at the inner cover 282 of the present embodiment, the secondary communication holes 286 extend through the peripheral wall 282b at the corresponding locations, respectively, which are spaced away from the bottom wall 282d in the axial direction. Thereby, the branched fuel can be circulated from the radial gap 280ar, which is located between the outer cover 280 and the peripheral wall 282b, into the inside space 282a through the secondary communication holes 286, which are spaced away from the bottom wall 282d. Thus, the stagnation of the branched fuel can be avoided in a wide range of the radial gap 280ar. Therefore, it is possible to limit the occurrence of, for example, the corrosion or the deterioration of the covers 280, 282, which would be otherwise induced by the change in the characteristics of the branched fuel that is stagnated particularly in the radial gap 280ar. As a result, the durability can be ensured, and the reliability can be improved.

Furthermore, the outer cover 280, which is urged toward the inlet portion 27 by the negative pressure at the outlet portion 28 of the present embodiment, is in sealing contact with the flange 270c, which is urged toward the outlet portion 28 by the positive pressure of the branched fuel at the inlet portion 27. Thereby, even though a seal member is not provided between the outer cover 280 and the flange 270c, the fuel space 280a and the inside space 282a can be held airtight by the outer cover 280. Thus, the circulating function, which circulates the branched fuel from the fuel space 280a into the inside space 282a through the suctioning of the branched fuel by the action of the negative pressure, can be reliably implemented even with the simple structure that does not have the seal member. As a result, the durability can be ensured, and the reliability can be improved.

Other Embodiments

Although the embodiment of the present disclosure have been described, the present disclosure should not be limited to the above embodiment and may be applied to various other embodiments and combinations of the embodiments without departing form the scope of the present disclosure.

Figure 7:
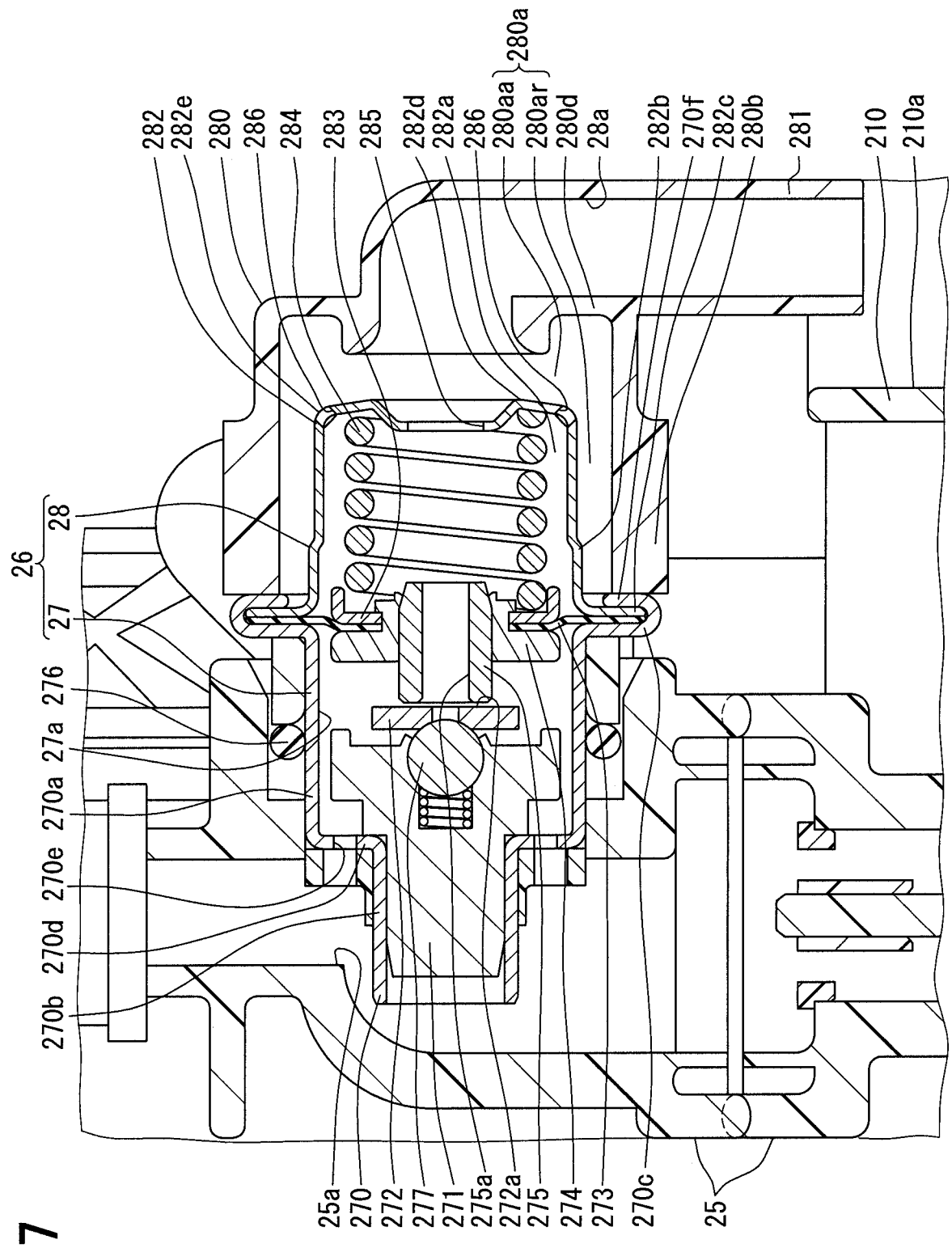
FIG. 7 is a cross-sectional view showing a modification of FIG. 6.
Figure 8:
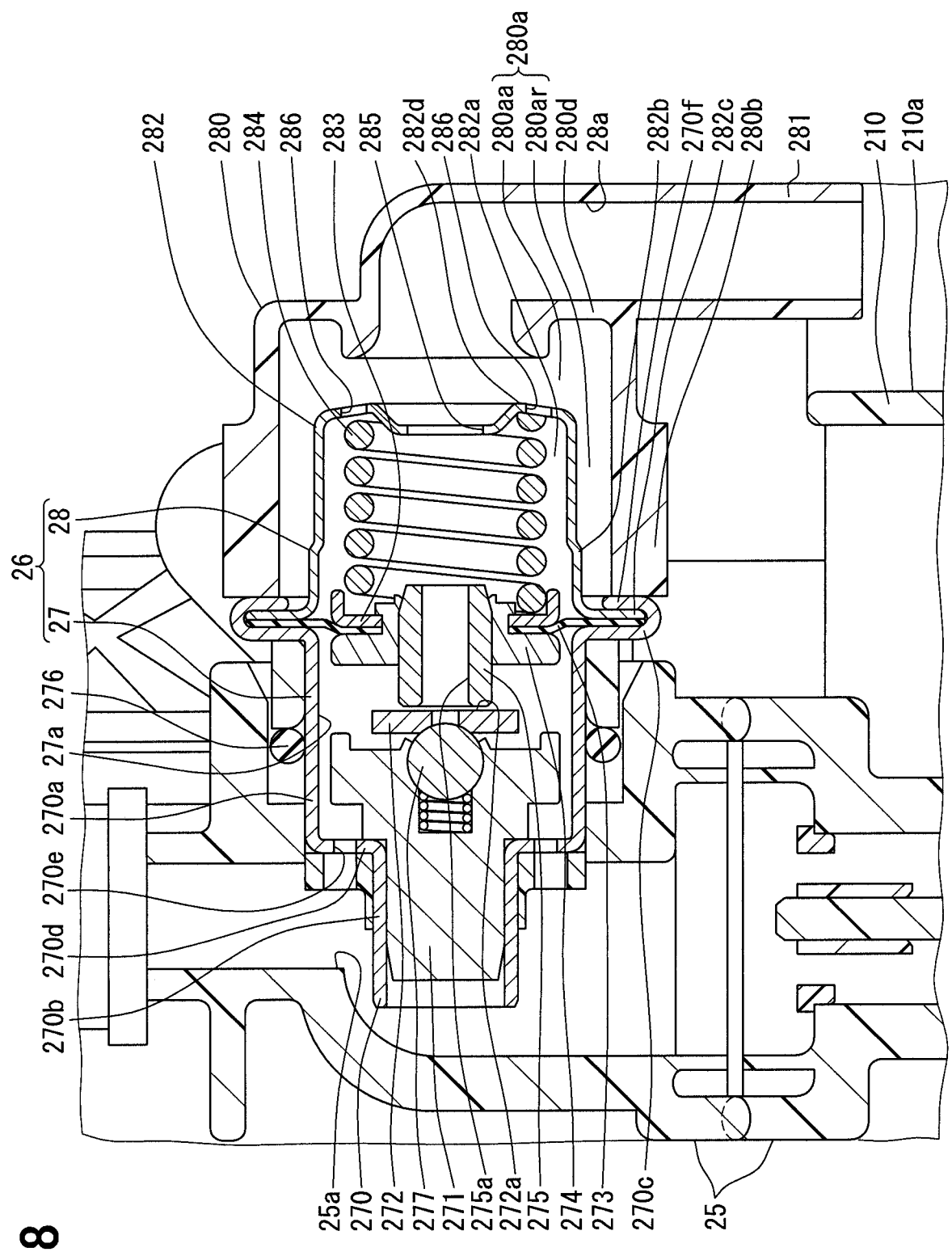
FIG. 8 is a cross-sectional view showing a modification of FIG. 6.

Specifically, as a first modification, as shown in FIG. 7, in the inner cover 282, the secondary communication holes 286 may be formed at a corner 282e, which is formed between the peripheral wall 282b and the bottom wall 282d at a location that is on the radially outer side of the primary communication hole 285. As a second modification, as shown in FIG. 8, in the inner cover 282, the secondary communication holes 286 may be formed at the bottom wall 282d at a location that is on the radially outer side of the primary communication hole 285.

Figure 9:
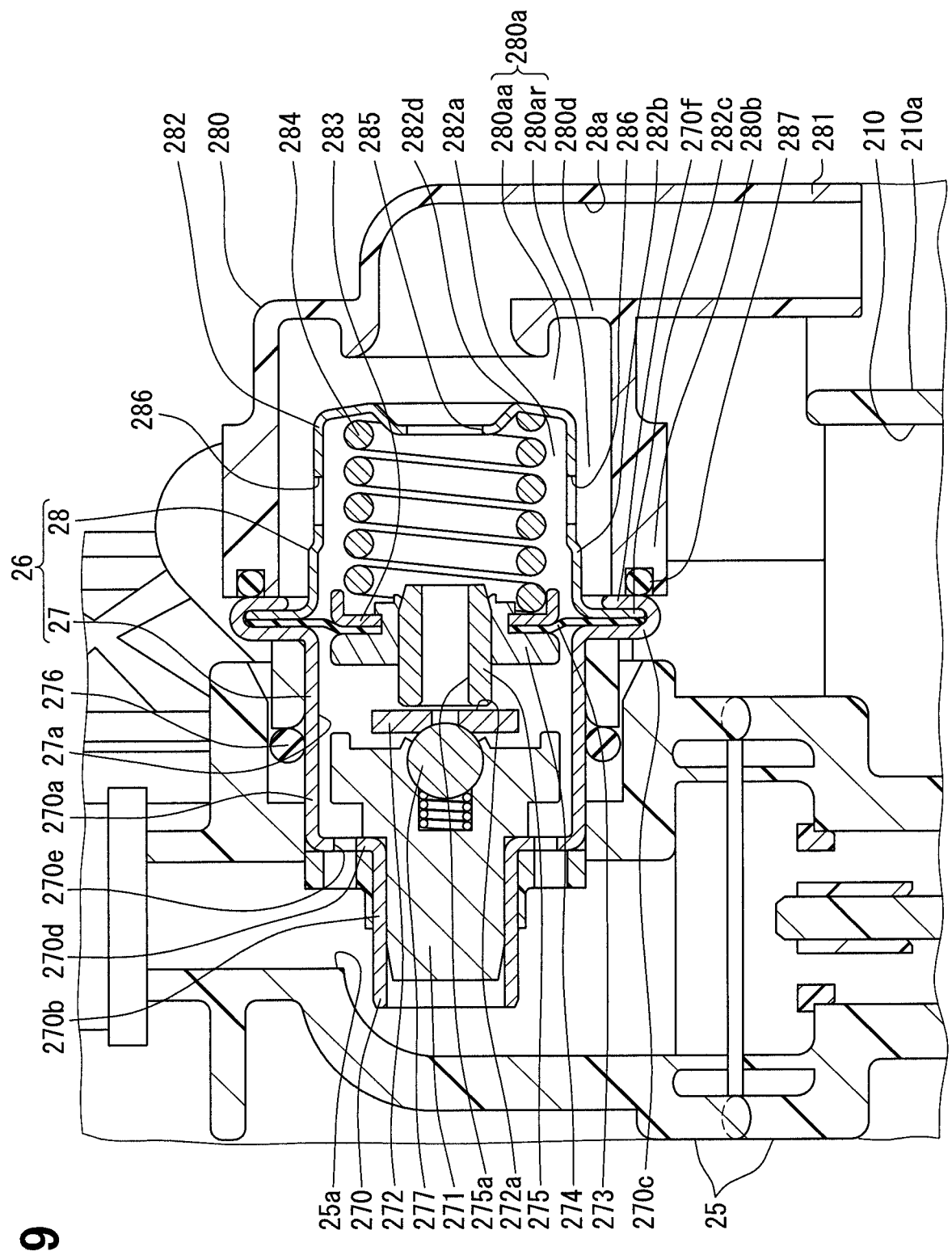
FIG. 9 is a cross-sectional view showing a modification of FIG. 6.
Figure 10:
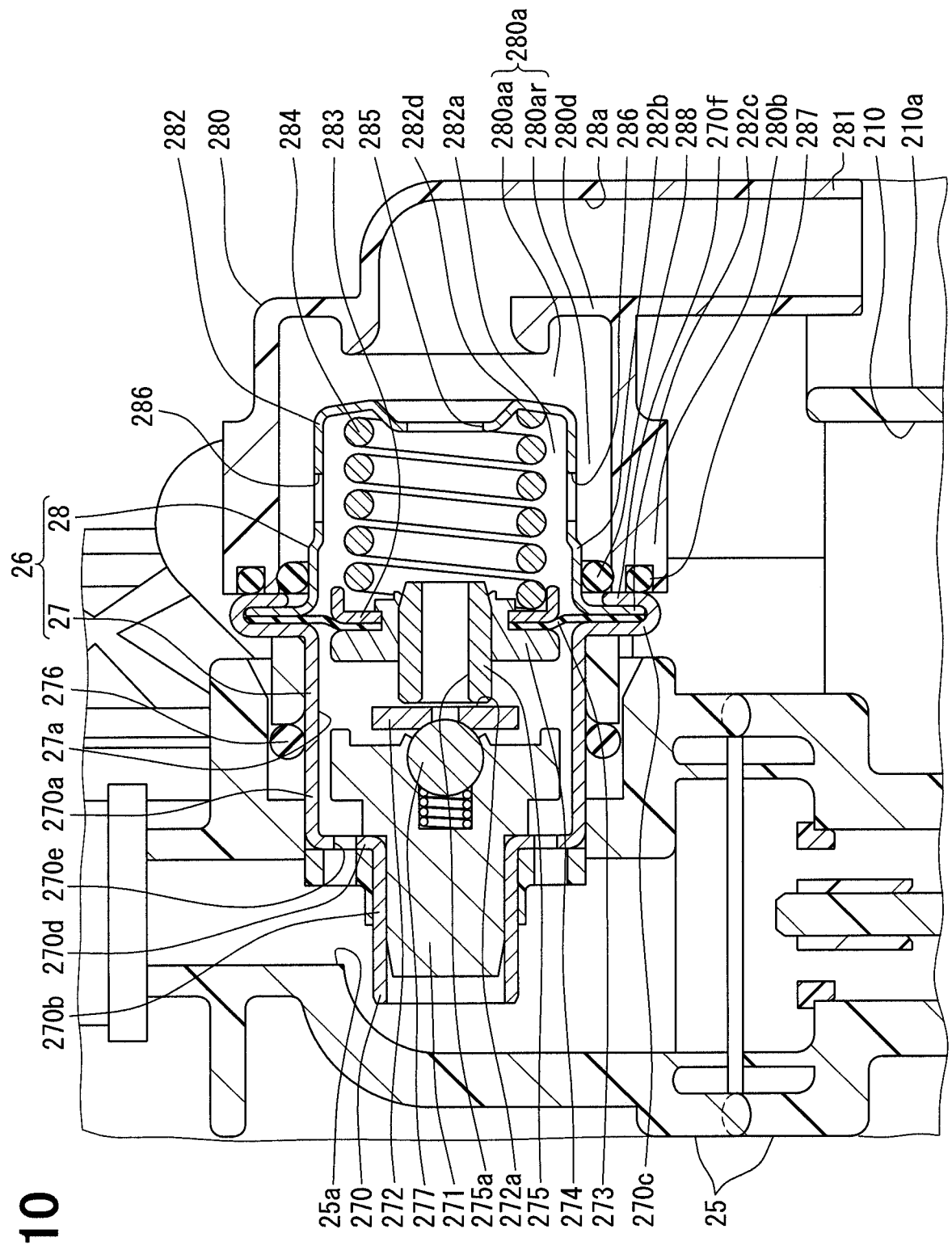
FIG. 10 is a cross-sectional view showing a modification of FIG. 6.
Figure 11:
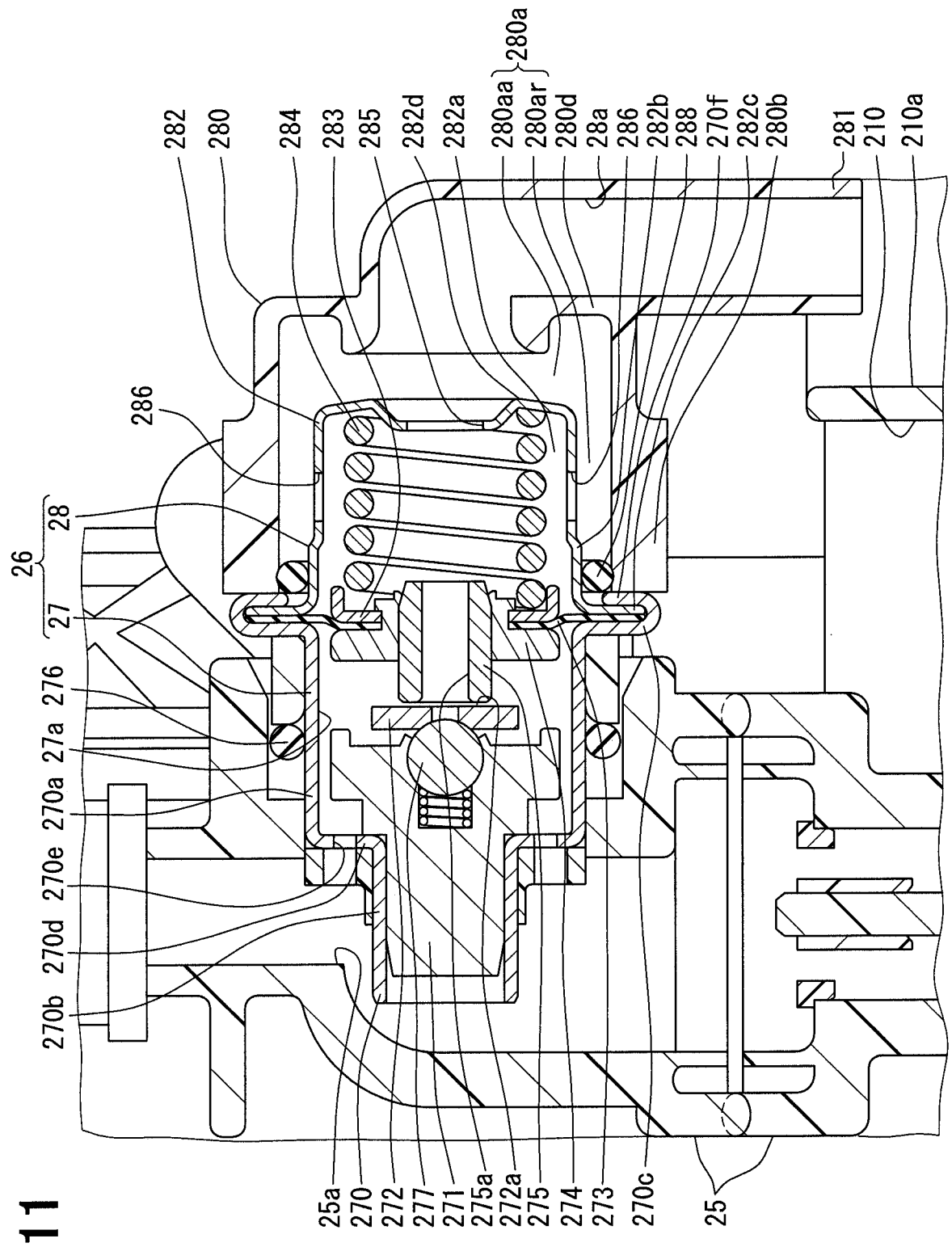
FIG. 11 is a cross-sectional view showing a modification of FIG. 6.
Figure 12:
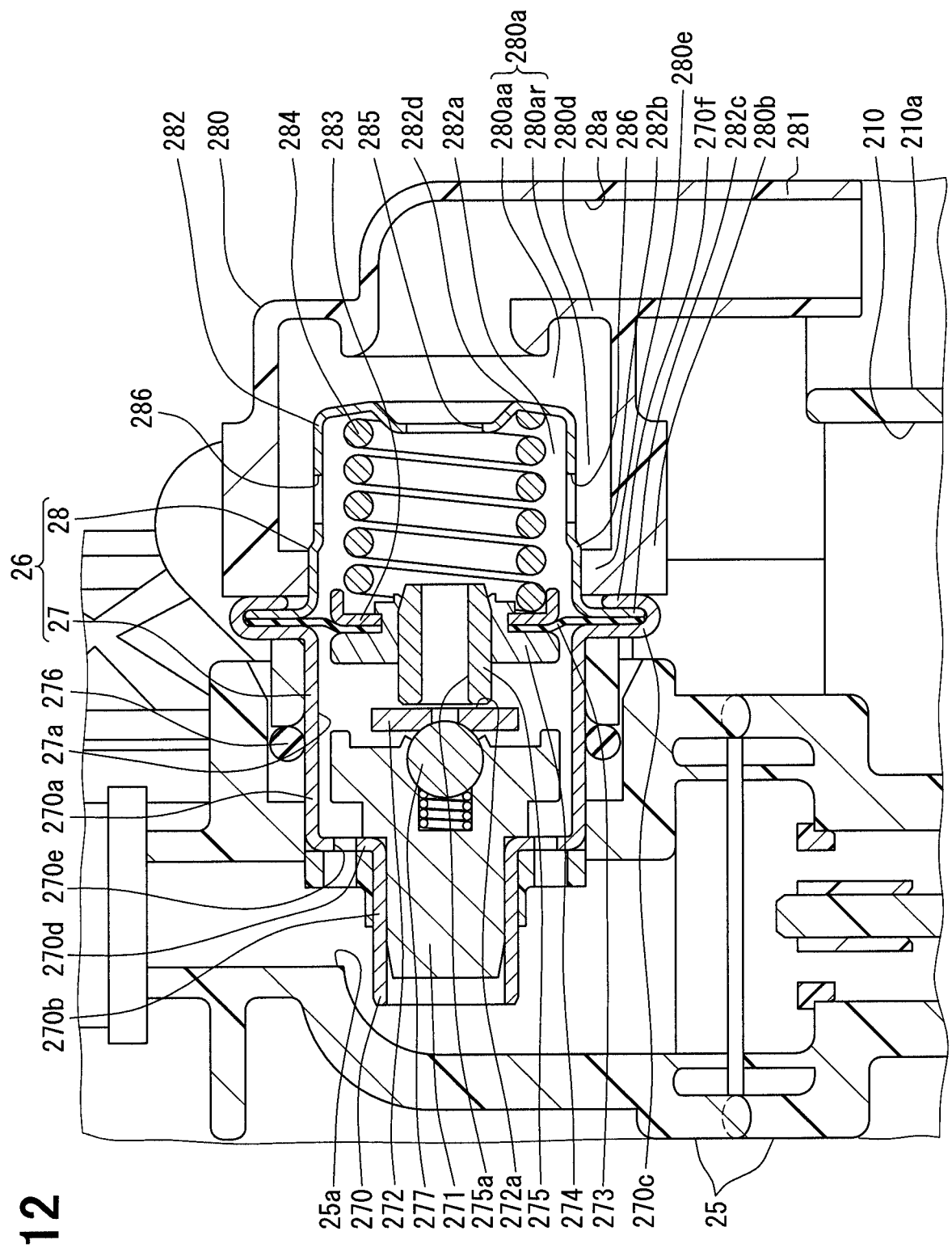
FIG. 12 is a cross-sectional view showing a modification of FIG. 6.

As a third modification, as shown in FIGS. 9 and 10, in the outlet portion 28, a seal member 287, such as an O-ring made of rubber, may be clamped in the axial direction between the peripheral wall 280b of the outer cover 280 and the crimped fixation portion 270f of the flange 270c of the stationary cover 270. As a fourth modification, as shown in FIGS. 10 and 11, in the outlet portion 28, a seal member 288, such as an O-ring made of rubber, may be clamped in the axial direction between the peripheral wall 280b of the outer cover 280 and the peripheral wall 282b of the inner cover 282. As a fifth modification, as shown in FIG. 12, in the outlet portion 28, the peripheral wall 282b of the inner cover 282 may be press fitted to a press fitting portion 280e formed at the peripheral wall 280b of the outer cover 280 to seal between the peripheral wall 280b and the peripheral wall 282b. In the cases of the third to fifth modifications, regardless of whether the outer cover 280 is in sealing contact with the flange 270c, which serves as the contact wall, the fuel space 280a and the inside space 282a are isolated from the outside of the outer cover 280 and are held airtight.

Figure 13:
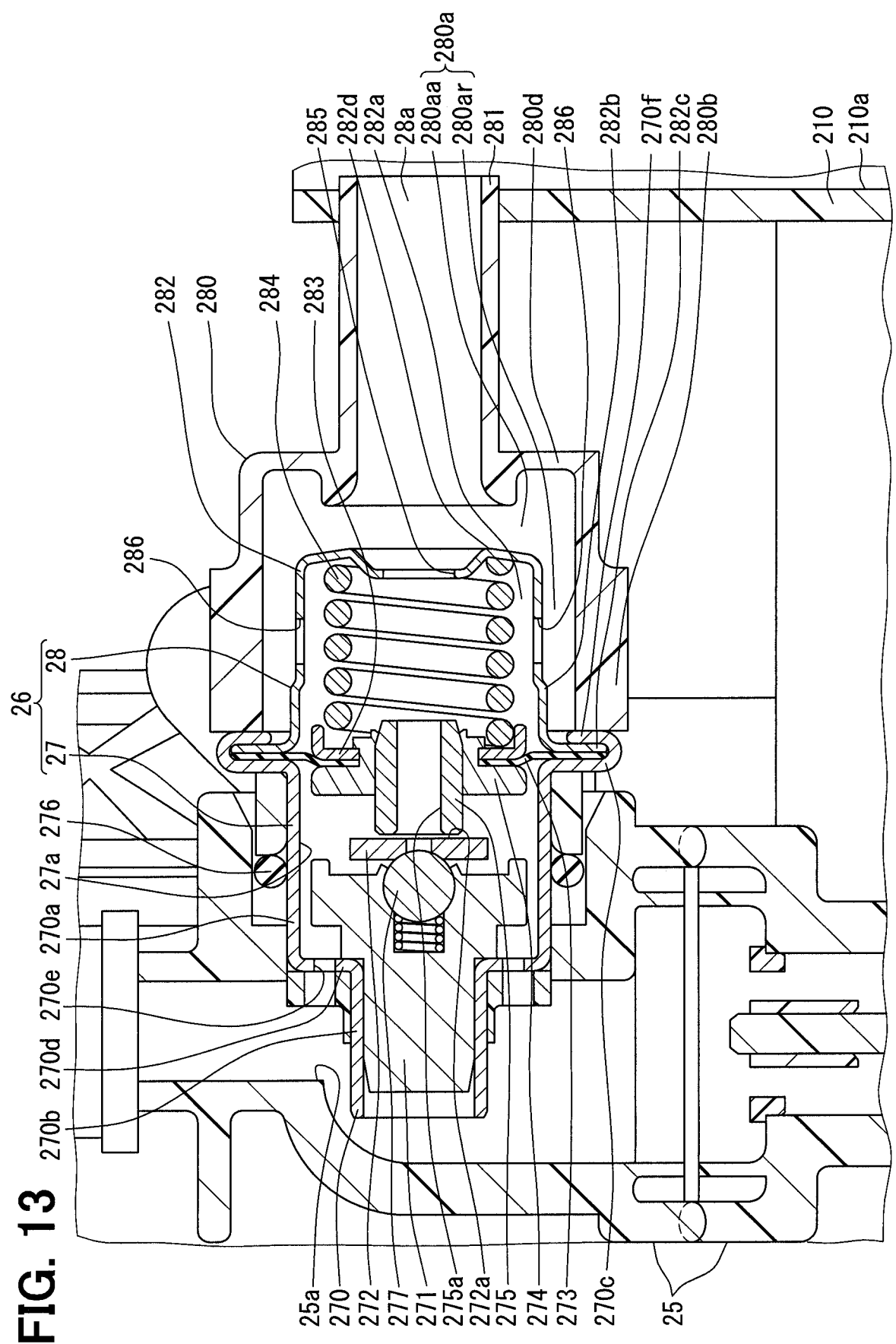
FIG. 13 is a cross-sectional view showing a modification of FIG. 6.

As a sixth modification, as shown in FIG. 13, the drain pipe 281 may be in a form of a cylindrical tube that is oriented to extend in the one transverse direction. In the case of the sixth modification, the inside of the drain pipe 281, the drain passage 28a is formed to be coaxial with the nozzle passage 275a, so that the drain passage 28a is communicated with the fuel space 280a. This drain passage 28a opens in the axial direction (specifically, the one transverse direction in FIG. 13) toward the storage space 210a of the sub-tank 210.

As a seventh modification, the constituent components 270-275 of the inlet portion 27 and the constituent components 280-284 of the outlet portion 28 may be arranged such that the axial direction of each of these constituent components 270-275, 280-284 is arranged along the longitudinal direction. As an eighth modification, the function of the adjusting spring 284 may be implemented by any of various types of resilient members, such as a spring which is in a form that is other than the form of coil spring, or a rubber member of a predetermined shape.

As a ninth modification, during a normal operation of the internal combustion engine 3, the valve closing operation of the valve element nozzle 275 may be executed. Then, at the time of, for example, checking a pressure sensor, which detects the fuel pressure of the fuel flow passage 25a, the fuel pressure of the fuel discharged from the fuel pump 22 may be temporarily increased to execute the valve opening operation of the valve element nozzle 275. Even in the case of the ninth modification, the fuel pressure of the fuel flow passage 25a is regulated through the valve opening operation of the valve element nozzle 275.

Figure 14:
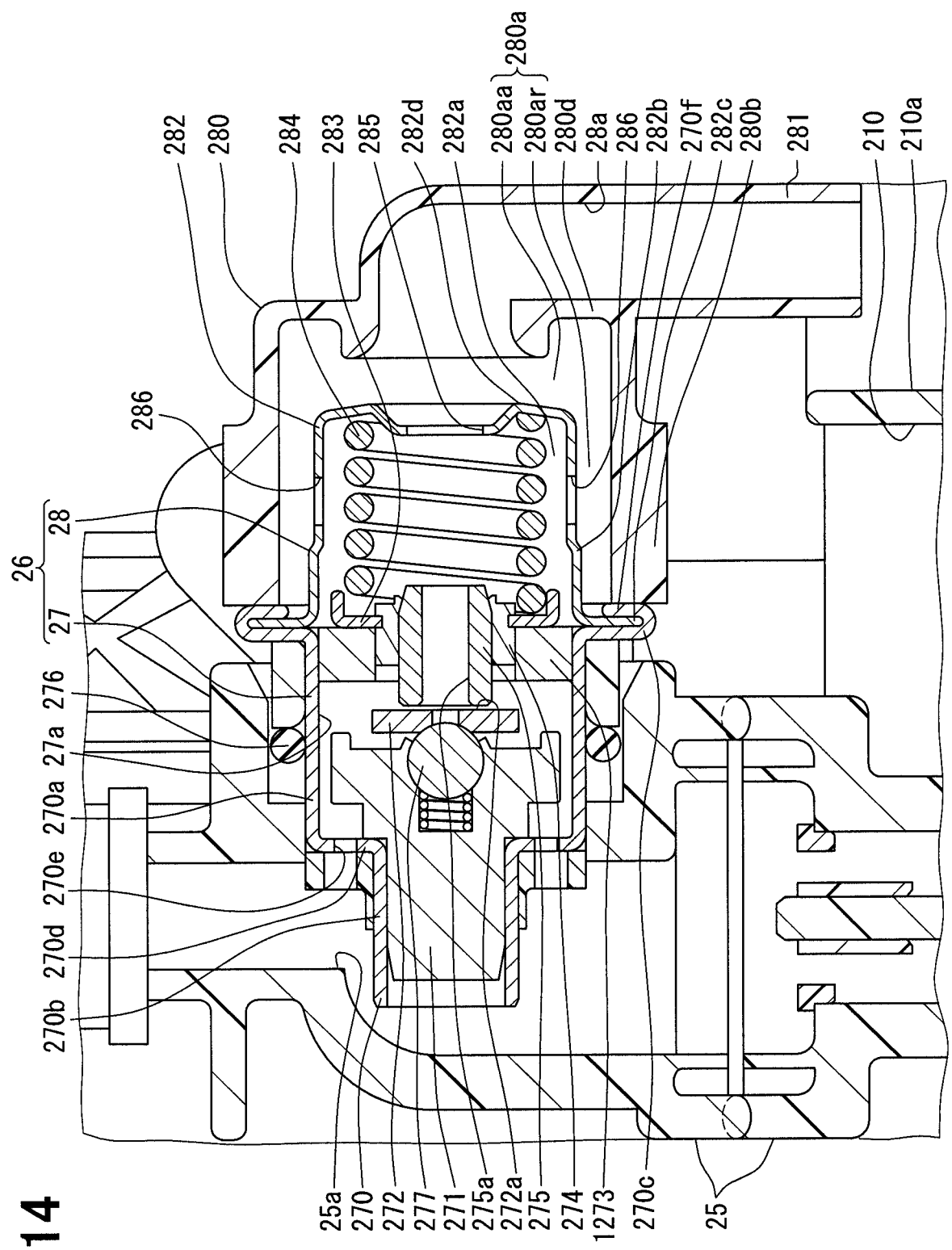
FIG. 14 is a cross-sectional view showing a modification of FIG. 6.

As a tenth modification, as shown in FIG. 14, a piston 1273, which implements the function of the partition element, may be provided in place of the diaphragm 273. In the case of the tenth modification, the piston 1273, which is in a form of a cylindrical tube, is slidably supported by the large diameter portion 270a of the stationary cover 270 in a manner that enables reciprocation of the piston 1273 in the axial direction, so that the inlet portion 27 and the outlet portion 28 are partitioned from each other. In this case, the valve element nozzle 275 is installed to an inner peripheral portion of the piston 1273 through the movable holder 274, so that the valve element nozzle 275 is supported by the piston 1273 in a manner that enables reciprocation of the valve element nozzle 275 in the axial direction (specifically, the one transverse direction in FIG. 14).

The invention claimed is:

1. A pressure regulator that regulates a fuel pressure in a fuel flow passage, which extends from a fuel pump toward an internal combustion engine, the pressure regulator comprising:
   an inlet portion and an outlet portion;
   a partition element that partitions between the inlet portion and the outlet portion; and
   a valve element nozzle that is supported by the partition element and extends through the partition element in an axial direction of the valve element nozzle, wherein:
   the valve element nozzle is driven to execute a valve opening operation of moving the valve element nozzle in the axial direction against a resilient member when a negative pressure is applied to the partition element through discharging of branched fuel, which is branched from the fuel flow passage to the inlet portion, to the outlet portion through the valve element nozzle; and
   the outlet portion includes:
      an inner cover that receives the resilient member in an inside space of the inner cover while the partition element is exposed in the inside space to receive the negative pressure generated by the branched fuel at the inside space, wherein a primary communication hole is formed in the inner cover to oppose the valve element nozzle in the axial direction, and a secondary communication hole is formed in the inner cover at a location, which is on a radially outer side of the primary communication hole; and
      an outer cover that covers the inner cover and thereby forms a fuel space, which is communicated with the inside space through the primary communication hole and the secondary communication hole, at a location between the inner cover and the outer cover, to discharge the branched fuel from the fuel space;
   the inlet portion includes a contact wall that is urged toward the outlet portion by a positive pressure of the branched fuel;
   the outer cover of the outlet portion is urged toward the inlet portion by the negative pressure and is thereby in sealing contact with the contact wall; and
   the secondary communication hole is a suction hole that is only configured to suction the branched fuel from the fuel space into the inside space when a flow of the branched fuel is discharged from the valve element nozzle to an outside of the inner cover through the inside space and the primary communication hole to generate the negative pressure around the flow of the branched fuel at the inside space in a state where the valve element nozzle is driven toward the primary communication hole in the axial direction to execute the valve opening operation.

2. The pressure regulator according to claim 1, wherein: the inner cover, which is in a form of a bottomed tube, includes:
- a peripheral wall that is located on a radially outer side of the valve element nozzle and surrounds the valve element nozzle, wherein the peripheral wall forms the secondary communication hole; and
- a bottom wall that is surrounded by the peripheral wall, which is located on a radially outer side of the bottom wall, wherein the bottom wall forms the primary communication hole;
- a gap, which is located between the bottom wall and the outer cover in the axial direction, and a gap, which is radially located between the peripheral wall and the outer cover, function as the fuel space in the outer cover.

3. The pressure regulator according to claim 2, wherein the secondary communication hole is formed in the peripheral wall such that the secondary communication hole is displaced away from the bottom wall in the axial direction.

4. A fuel supply device comprising:
- a fuel pump that discharges fuel to a fuel flow passage, which extends toward an internal combustion engine; and
- a pressure regulator that regulates a fuel pressure in the fuel flow passage and includes:
  - an inlet portion and an outlet portion;
  - a partition element that partitions between the inlet portion and the outlet portion; and
  - a valve element nozzle that is supported by the partition element and extends through the partition element in an axial direction of the valve element nozzle, wherein:
- the valve element nozzle is driven to execute a valve opening operation of moving the valve element nozzle in the axial direction against a resilient member when a negative pressure is applied to the partition element through discharging of branched fuel, which is branched from the fuel flow passage to the inlet portion, to the outlet portion through the valve element nozzle; and
- the outlet portion includes:
  - an inner cover that receives the resilient member in an inside space of the inner cover while the partition element is exposed in the inside space to receive the negative pressure generated by the branched fuel at the inside space, wherein a primary communication hole is formed in the inner cover to oppose the valve element nozzle in the axial direction, and a secondary communication hole is formed in the inner cover at a location, which is on a radially outer side of the primary communication hole; and
  - an outer cover that covers the inner cover and thereby forms a fuel space, which is communicated with the inside space through the primary communication hole and the secondary communication hole, at a location between the inner cover and the outer cover, to discharge the branched fuel from the fuel space;
- the inlet portion includes a contact wall that is urged toward the outlet portion by a positive pressure of the branched fuel;
- the outer cover of the outlet portion is urged toward the inlet portion by the negative pressure and is thereby in sealing contact with the contact wall; and
- the secondary communication hole is a suction hole that is only configured to suction the branched fuel from the fuel space into the inside space when a flow of the branched fuel is discharged from the valve element nozzle to an outside of the inner cover through the inside space and the primary communication hole to generate the negative pressure around the flow of the branched fuel at the inside space in a state where the valve element nozzle is driven toward the primary communication hole in the axial direction to execute the valve opening operation.

\* \* \* \* \*